United States Patent
Nernberger et al.

(10) Patent No.: US 11,618,992 B2
(45) Date of Patent: Apr. 4, 2023

(54) STEAM GENERATOR WITH PRE-HEAT CHAMBER AND FILTER

(71) Applicant: Spectrum Brands, Inc., Middleton, WI (US)

(72) Inventors: Kroy Everett Nernberger, Madison, WI (US); Boopalan Sampath, Madison, WI (US); Daniel Richard Strong, Madison, WI (US); Adam Joseph Mayer, Coralville, IA (US)

(73) Assignee: Spectrum Brands, Inc., Middleton, WI (US)

( * ) Notice: Subject to any disclaimer, the term of this patent is extended or adjusted under 35 U.S.C. 154(b) by 580 days.

(21) Appl. No.: 16/615,639

(22) PCT Filed: Jun. 8, 2018

(86) PCT No.: PCT/US2018/036620
§ 371 (c)(1),
(2) Date: Nov. 21, 2019

(87) PCT Pub. No.: WO2018/231643
PCT Pub. Date: Dec. 20, 2018

(65) Prior Publication Data
US 2020/0165769 A1    May 28, 2020

Related U.S. Application Data

(60) Provisional application No. 62/521,038, filed on Jun. 16, 2017.

(51) Int. Cl.
*D06F 75/16* (2006.01)
*D06F 75/12* (2006.01)
(Continued)

(52) U.S. Cl.
CPC ............. *D06F 75/16* (2013.01); *B01D 35/12* (2013.01); *D06F 75/12* (2013.01); *B01D 29/35* (2013.01); *B01D 39/10* (2013.01)

(58) Field of Classification Search
CPC ......... D06F 75/12; D06F 75/16; B01D 35/12; B01D 29/35; B01D 39/10
See application file for complete search history.

(56) References Cited

U.S. PATENT DOCUMENTS 3,003,899 A   10/1961   Eberhard et al.
3,082,312 A   3/1963    Shaw
(Continued)

FOREIGN PATENT DOCUMENTS

CN   2550402 Y      5/2003
CN   2937201 Y  *   8/2007
(Continued)

OTHER PUBLICATIONS

International Search Report for co-pending PCT/US2018/036620, 5 pages, dated Aug. 23, 2018.
(Continued)

*Primary Examiner* — Ismael Izaguirre
(74) *Attorney, Agent, or Firm* — Kagan Binder, PLLC

(57) ABSTRACT

A steam generator includes a pre-heat chamber configured to heat incoming water to a temperature less than the boiling point of water, where the pre-heat chamber is configured to heat the water such that if the water contains a calcium compound, the calcium compound is caused to take a particulate form. The steam generator also includes a filter assembly in fluid communication with the pre-heat chamber, the filter assembly including a removable particulate filter element, where the filter element is reusable and cleanable. The steam generator also includes a water pump in fluid communication with the filter assembly, and operative to (Continued)

cause water flow through the steam generator and a boiler in fluid communication with the water pump, where the water pump is configured to cause water to flow to the boiler, and where the boiler is configured to boil water such that steam is produced.

19 Claims, 9 Drawing Sheets

(51) Int. Cl.
  *B01D 35/12* (2006.01)
  *B01D 29/35* (2006.01)
  *B01D 39/10* (2006.01)

(56) References Cited

U.S. PATENT DOCUMENTS

| | | | |
|---|---|---|---|
| 4,991,545 A | 2/1991 | Rabe et al. | |
| 5,279,055 A | 1/1994 | Eckert et al. | |
| 5,345,704 A | 9/1994 | Guillot et al. | |
| 5,398,434 A | 3/1995 | Biancalani | |
| 5,587,055 A * | 12/1996 | Hartman | B01D 3/42 |
| | | | 202/202 |
| 5,592,764 A | 1/1997 | Boulud et al. | |
| 5,638,622 A | 6/1997 | Hohn | |
| 5,669,287 A * | 9/1997 | Jefferson, Jr. | A47J 31/002 |
| | | | 99/302 R |
| 5,743,034 A | 4/1998 | Debourg et al. | |
| 5,782,252 A * | 7/1998 | Lewis | B08B 3/06 |
| | | | 134/148 |
| 5,842,295 A | 12/1998 | Ching et al. | |
| 6,178,671 B1 | 1/2001 | Zwanenburg et al. | |
| 6,212,332 B1 | 4/2001 | Sham et al. | |
| 6,314,668 B1 | 11/2001 | Daulasim et al. | |
| 6,446,370 B1 | 9/2002 | Ostermaier | |
| 6,513,462 B1 | 2/2003 | Shiraishi et al. | |
| 7,326,893 B2 | 2/2008 | Kanzaki et al. | |
| 8,615,908 B2 | 12/2013 | Collinson et al. | |
| 9,404,649 B2 | 8/2016 | Ashton et al. | |
| 2001/0032599 A1 | 10/2001 | Fischer et al. | |
| 2009/0000163 A1 | 1/2009 | Fang | |
| 2009/0101490 A1 * | 4/2009 | Thiers | B01D 1/305 |
| | | | 202/180 |
| 2010/0011629 A1 | 1/2010 | Pieters et al. | |
| 2010/0242316 A1 | 9/2010 | Wielstra | |
| 2011/0278283 A1 | 11/2011 | Park | |
| 2012/0039586 A1 | 2/2012 | Collinson et al. | |
| 2012/0051723 A1 | 3/2012 | Hsu | |
| 2016/0258109 A1 | 9/2016 | Collet | |

FOREIGN PATENT DOCUMENTS

| | | |
|---|---|---|
| CN | 101233274 A | 7/2008 |
| CN | 201221031 Y | 4/2009 |
| CN | 102369319 A | 3/2012 |
| CN | 103168151 A | 6/2013 |
| CN | 105088734 A | 11/2015 |
| DE | 10357545 A1 | 7/2005 |
| EP | 1201813 A1 | 5/2002 |
| EP | 1541746 A1 | 6/2005 |
| EP | 1616992 A1 | 11/2009 |
| EP | 2397063 A1 | 12/2011 |
| EP | 2410088 A1 | 1/2012 |
| EP | 2047174 B1 | 3/2012 |
| EP | 2789729 B1 | 10/2014 |
| EP | 2610403 B1 | 11/2014 |
| EP | 2803761 A1 | 11/2014 |
| EP | 2811065 B1 | 12/2014 |
| EP | 2942430 A1 | 11/2015 |
| EP | 2942431 A1 | 11/2015 |
| EP | 3002363 A1 | 4/2016 |
| WO | 2003066953 A1 | 8/2003 |
| WO | 2006006187 A1 | 1/2006 |
| WO | 2006067722 | 6/2006 |
| WO | 2007013002 A2 | 2/2007 |
| WO | 2010089565 A1 | 8/2010 |
| WO | 2011110979 A2 | 11/2011 |
| WO | 2012085602 A1 | 6/2012 |
| WO | 2017186607 A1 | 11/2017 |

OTHER PUBLICATIONS

China Search for co-pending Chinese Patent Application No. 201880053232X, 2 pages, Nov. 12, 2021.
Extended European Search Report for copending European Patent Application No. 18818581.3, 7 pages, dated Dec. 14, 2020.
International Search Report for PCT/US201 7/052740, 5 pages, dated Dec. 7, 2017.
International Search Report for PCT/US2018/058442, 4 pages, dated Jul. 30, 2019.

* cited by examiner

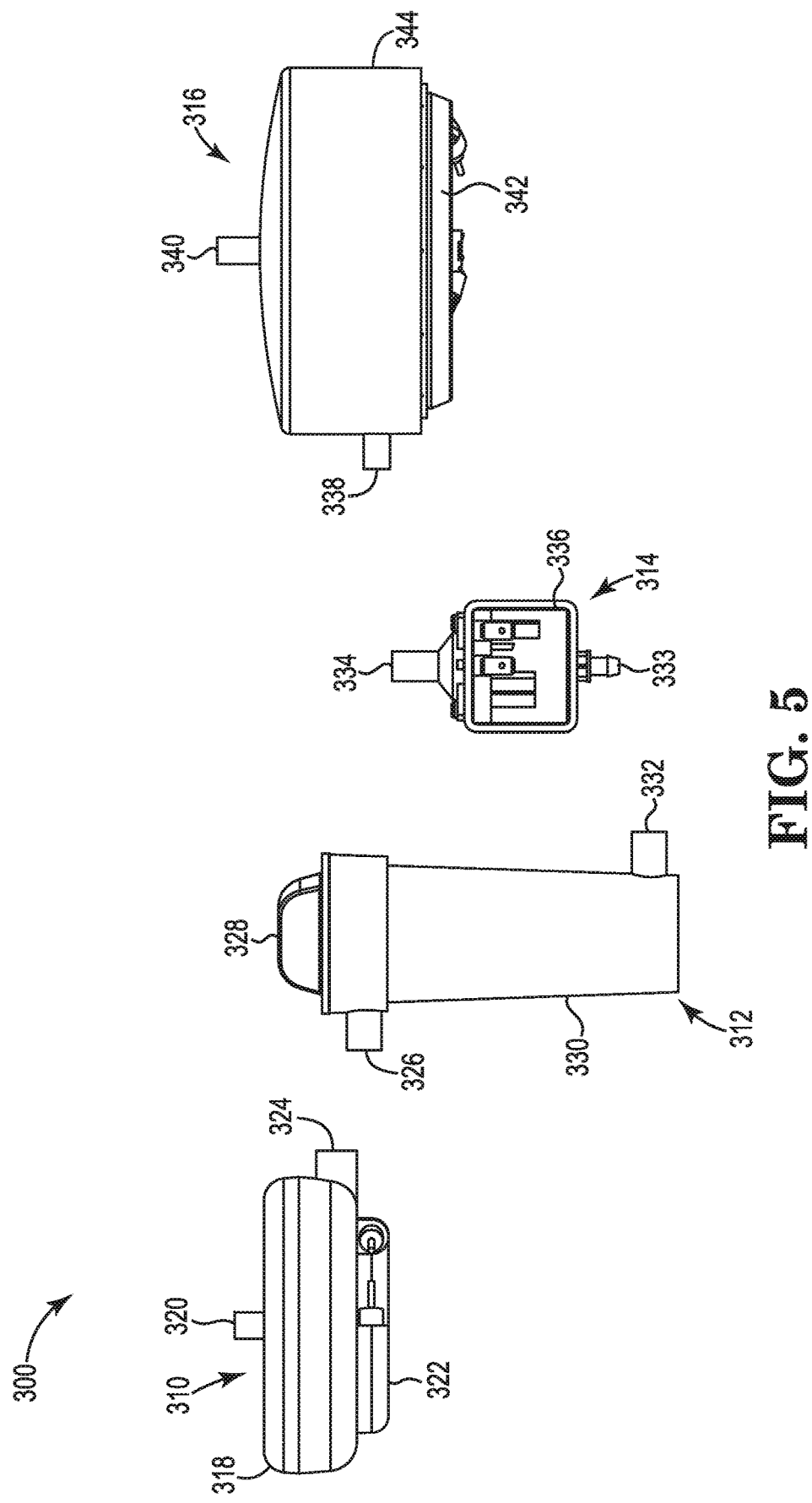

STEAM GENERATOR WITH PRE-HEAT CHAMBER AND FILTER

CROSS REFERENCE TO RELATED APPLICATIONS

This application claims priority to International Application No. PCT/US2018/036620, filed on Jun. 8, 2018, which in turn claims the benefit of U.S. Provisional Application No. 62/521,038, filed Jun. 16, 2017, the entire contents of which are incorporated herein by reference in their entireties.

FIELD OF THE INVENTION

The present invention is directed to a steam generator configuration with improved water softening performance during repeated and/or extended steam generation use.

BACKGROUND OF THE INVENTION

Steam delivery devices such as steam irons and garment steamers are well known as providing for various clothes smoothing or otherwise steaming devices comprising a water reservoir within the iron body and comprising a heated soleplate (having a surface for contacting clothing), a head (for garment steaming), or other steam delivery device, nozzle, head, or orifice. In the case of an iron, water may be heated by the soleplate or a separate heater to create steam that can be continuously delivered through holes of the soleplate or may be controlled to be delivered as a response to activation by a trigger or the like or as a result of certain sensed conditions.

More recently, steam stations (also known as ironing centers or steam ironing stations) have been developed that utilize a steam delivery device, such as an iron provided with a heated soleplate, but without a water reservoir, where the iron is connected with a steam generation base unit having a steam generator that includes a water reservoir and a heating device for creating steam. The steam and usually electrical power are delivered to the iron by way of a steam conduit and electrical wires, respectively, that are provided within a flexible hose that allows the iron the be manipulated independently of the base unit.

In the case of the steam delivery device, typically the steam generator of the steam generation base unit and the steam delivery device (e.g., an iron) are also physically connectable to one another, such as by a latching mechanism of a mechanical type. The iron is also then releasable from the base unit by unlatching of the mechanism for use. The iron itself of such a steam generator is typically designed like a conventional iron having a handle portion to allow manipulation of the iron, in particular its soleplate, for steaming and pressing clothing or the like. As compared with a conventional iron, a stream generator of a steam station can produce a much greater quantity of steam over longer time since the steam is generated within the base unit, which is typically larger than an iron and includes a bigger water reservoir and more powerful steam generator.

A water reservoir of a steam generator is typically provided so as to be refillable with water either by providing an access to the reservoir as positioned within the steam generator or by providing a removable reservoir. Either way, the reservoir is sized and shaped to hold a sufficient quantity of water based upon the needs for typical usage. The larger the steam generator, the greater the potential for water capacity of the water reservoir, and the greater the weight of the unit itself. A competing desire is to keep the steam station portable. Water as provided within a water reservoir also adds very significantly to the weight of the unit.

Prior art steam generators have a common shortcoming related to the build-up of minerals (e.g., calcium carbonate) within the steam generator components during use, especially when using so-called "hard" water. Calcium carbonate is commonly found in household or business water supplies. As such, when the phase of the water changes to steam (gas) during boiling, the calcium can build up as calcification (also referred to as scale, limescale, etc.) where the liquid water was vaporized into steam gas by a boiler. Calcification is especially prone to formation on hot surfaces, e.g., where water is before being boiled. Steaming garment care appliances generally receive calcification build-up on the boiler surfaces, which over time causes reduced boiler performance and efficiency, and can also cause calcification deposits to travel down the steam path and out of the iron or head, onto the garment.

As boilers tend to be hottest at locations closest to the various heating elements or heat sources, these locations and surrounding areas also tend to suffer from the most calcification. Calcium carbonate is generally even more present in so-called "hard" water. Calcification build-up in steam generator components can be especially pronounced in the heated water boiler units employed in typical steam generators to turn incoming water into usable steam. Calcification, when built up over time, can negatively affect the utility of the steam generator, and in some cases and make the steam generator clog or become ineffective. The boiler units, where the majority of calcification tends to occur, also tend to be very difficult to clean (i.e., remove the calcification deposits or scale). In fact, many boiler units should be hermetically sealed for proper operation, and therefore need to be substantially disassembled to access the internal parts of the boiler, making cleaning difficult and often not able to be accomplished by a user.

Consumable resin containers have been devised to remove the calcium carbonate from the water before it reaches the boiler, but these resin containers suffer from many drawbacks. Known resin containers have a limited performance lifespan and need to be replaced regularly to prevent calcium build-up in the boiler. Utilizing such resin containers represent an added cost and inconvenience to the consumer, and without them, calcium carbonate build-up would occur in the boiler.

SUMMARY OF THE INVENTION

The present invention overcomes shortcomings of the prior art steam generators in providing a steam generator having a multi-stage water steaming configuration where a water pre-heat chamber first receives water from a source where the water is heated to a temperature below boiling, followed by a filtering of the heated, liquid water using a reusable filter that works with the pre-heated water to catch calcium carbonate solids. The pre-heat chamber raises the water temperature enough to cause the calcium carbonate in the water to precipitate and form solid particulate matter, such as flakes. The filter then catches the solid particulates before they would travel to the boiler.

Next, the filtered, heated, liquid water is boiled into steam in a primary boiler. Such a combination allows for calcification particulates to be collected in the filter positioned between the water preheater and the primary boiler. Moreover, by including such a filter where a majority of calcium particulates are caught in operation, a user can more easily clean the steam generator by flushing caught particulates from the filter instead of descaling the primary boiler. The filter is preferably reusable, so the consumer can remove it, wash out the particulates from it, and replace the filter in the appliance for continued use. In other embodiments, the filter is designed for one-time use or for temporary use, and can be disposable.

According to a first aspect of the present disclosure, a steam generator is disclosed. According to the first aspect, the steam generator includes a pre-heat chamber that is controlled to heat incoming water to a temperature less than the boiling point of water, where the pre-heat chamber is controlled to heat the water such that if the water contains a calcium compound, such as calcium carbonate, the calcium compound is caused to take a particulate form. The steam generator also includes a filter assembly in fluid communication with the pre-heat chamber, the filter assembly including at least a removable particulate filter element. Preferably, the filter element can be reusable and/or cleanable. The steam generator also includes a water pump in fluid communication with the filter assembly, and operative to cause water flow through the steam generator. The steam generator also includes a boiler in fluid communication with the water pump, where the water pump is controlled to cause water to flow to the boiler, and where the boiler is controlled to boil water such that steam is produced.

According to a second aspect of the present disclosure, a steam station is disclosed. According to the second aspect, the steam station includes a steam delivery device fluidly connected to a steam generator. The steam station also includes a water reservoir fluidly connected to the steam generator. The steam station also includes a steam generation base comprising the steam generator. According to the second aspect, the steam generator includes a pre-heat chamber controlled to heat incoming water to a temperature less than the boiling point of water, where the pre-heat chamber is controlled to heat the water such that if the water contains a calcium compound, such as calcium carbonate, the calcium compound is caused to take a particulate form. The steam generator also includes a filter assembly in fluid communication with the pre-heat chamber, the filter assembly including at least a removable particulate filter element, where the filter element is reusable and cleanable. The steam generator also includes a water pump in fluid communication with the filter assembly, and operative to cause water flow through the steam generator. The steam generator also includes a boiler in fluid communication with the water pump, where the water pump is controlled to cause water to flow to the boiler, and where the boiler is controlled to boil water such that steam is produced.

According to a third aspect of the present disclosure, a method of controlling a steam generator is disclosed. According to the third aspect, the method includes heating a first quantity of water to a temperature less than the boiling point of water, using a pre-heat chamber in operative communication with a controller, where the water is heated such that if the water contains a calcium compound, such as calcium carbonate, the calcium compound is caused to take a particulate form. The method also includes pumping the water through a filter assembly, using a water pump in operative communication with the controller. Preferably, the filter assembly includes at least a removable particulate filter element, where the filter element is reusable and cleanable. The method also includes pumping the water to a boiler in operative communication with the controller using the water pump. The method also includes boiling the water using the boiler such that steam is produced.

BRIEF DESCRIPTION OF THE DRAWINGS

FIG. 5 is a side exploded view of various decalcification components of the steam generator for use with a steam station as shown with respect to FIG. 1, according to various embodiments.

DETAILED DESCRIPTION OF THE PREFERRED EMBODIMENTS

Figure 2:
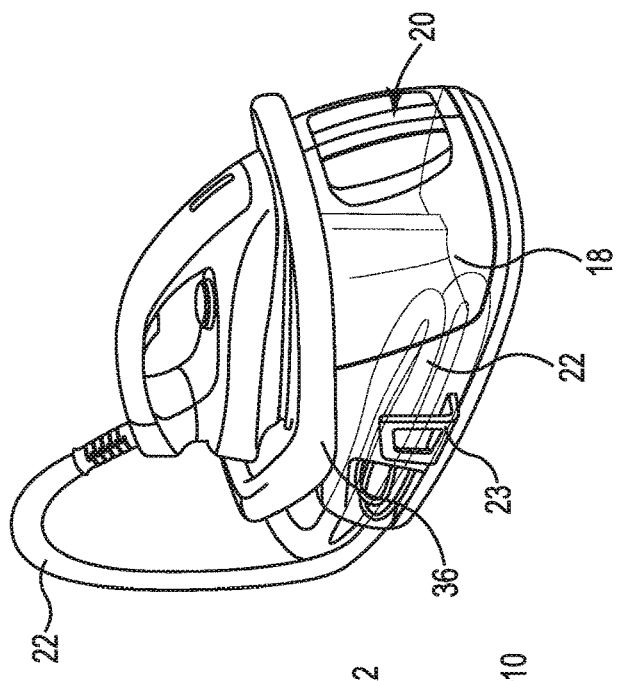
FIG. 2 is a perspective view of the steam station of FIG. 1 also showing a flexible hose connecting the iron and steam generator base to facilitate steam passage from the steam generator base to the iron and to allow for electrical connection between them.
Figure 1:
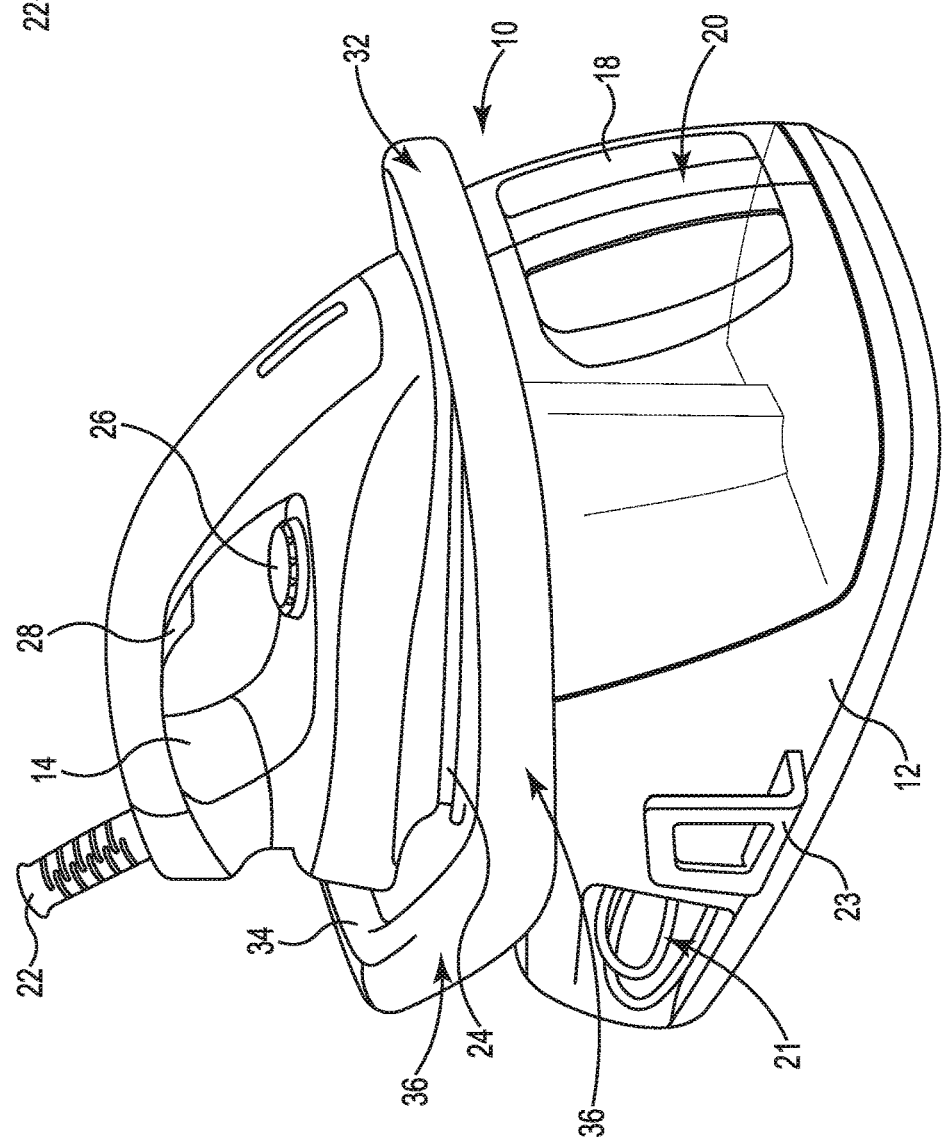
FIG. 1 is a perspective view of a steam station in accordance with the present invention comprising a steam generator base and a removable iron that are positioned together.
Figure 4:
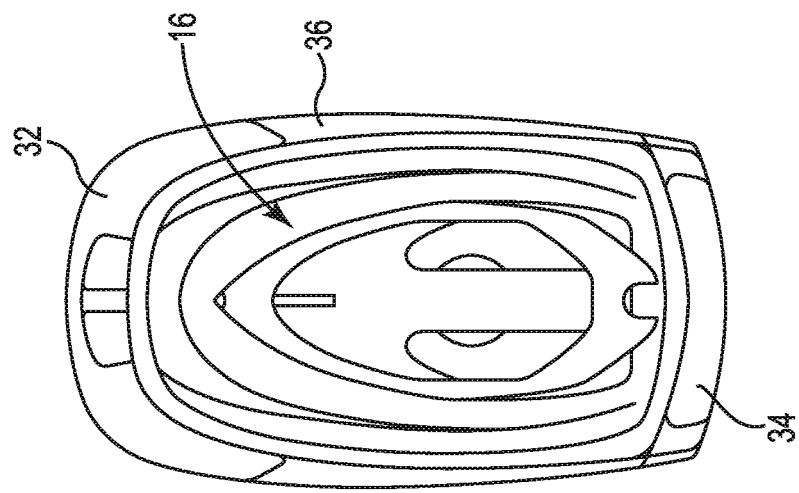
FIG. 4 is a top view of the steam station of FIG. 1 showing the iron positioned within a central zone of a top surface of the steam generator base with the front and rear handles positioned forward and rearward of the iron front and back portions.

Embodiments of the present invention are directed to a steam station 10, as illustrated in FIG. 1, that comprises a combination of an improved, decalcifying steam generator base 12 and an example steam delivery device, iron 14, through which steam can be applied. Steam station 10 can include various steam generator components, which can include the steam generator base 12. It is noted that like components are labelled with like numerals throughout the several figures. A steam station 10 is useful for steaming garments and the like, where the steam generator base 12 can provide significantly more steam in quantity and flow rate to the iron 14, as compared with a conventional steam iron. A steam station 10 according to the present invention provides desirable steam production by way of a unit with improved decalcification (i.e., descaling or anti-calcification) performance. In other embodiments, the components shown in FIGS. 5-10 can be employed in diverse other steam generation and/or boiler units (e.g., boiler 316) and systems.

The steam generator base 12 is shaped to support the iron 14 on a top surface 16 thereof. Preferably, the top surface 16 is inclined to position the iron 14 in an ergonomic position for a user. The steam generator base 12 also preferably houses a number of operative components to provide a supply of steam from the steam generator base 12. Specifically, a water reservoir 18 provides a refillable supply of water that can be turned into steam. It is preferable that the size of the water reservoir 18 be sufficient to supply a desired quantity of steam at a desired rate from the iron 14, as discussed more in detail below.

The water reservoir 18 is also preferably removable from the steam generator base 12 for filling and refilling with water. However, in other embodiments, the water reservoir 18 is non-removably fixed to the steam generator base 12. In the shown embodiment, the water reservoir 18 comprises a slidable component, like a drawer, that is slidably supported to move within the steam generator base 12 and to be removable for filling. Slide components (not shown) can include commercially available slide devices that can be mounted within the interior of the steam generator base 12, or the steam generator base 12 can be formed with integral components that provide slide bearing surfaces to guide the water reservoir 18 within the steam generator base 12. Otherwise, the water reservoir 18 can simply be removed from the steam generator base 12, which action may require manipulation of latching mechanism, or the removal of a component for access or not. As shown, the water reservoir 18 can be formed with a handle portion 20 that allows for easy manipulation of the water reservoir 18 to and from the steam generator base 12. The water reservoir 18 can also be transparent, as illustrated, so that a water level therein can be easily ascertained.

Figure 3:
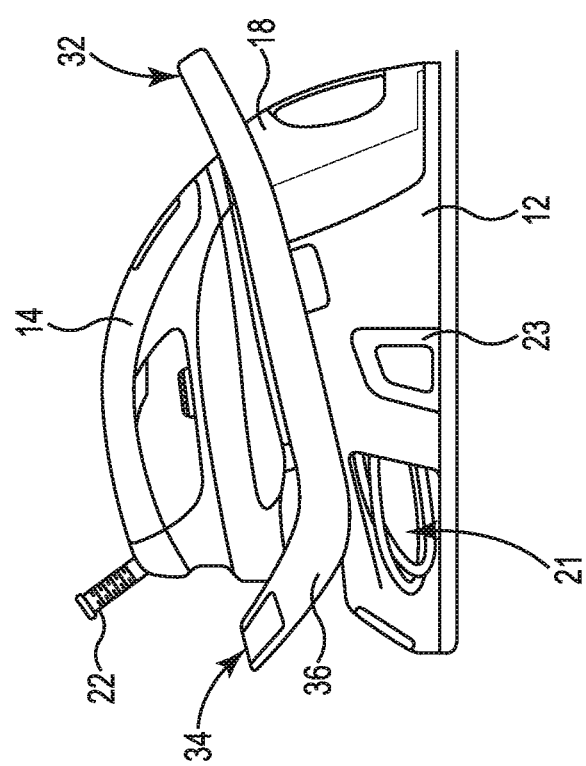
FIG. 3 is a side view of the steam station of FIG. 1 showing the iron positioned to the steam generator base and illustrating front and back handles or gripping portions of the steam generator base and in accordance with an embodiment of the present invention.
Figure 6:
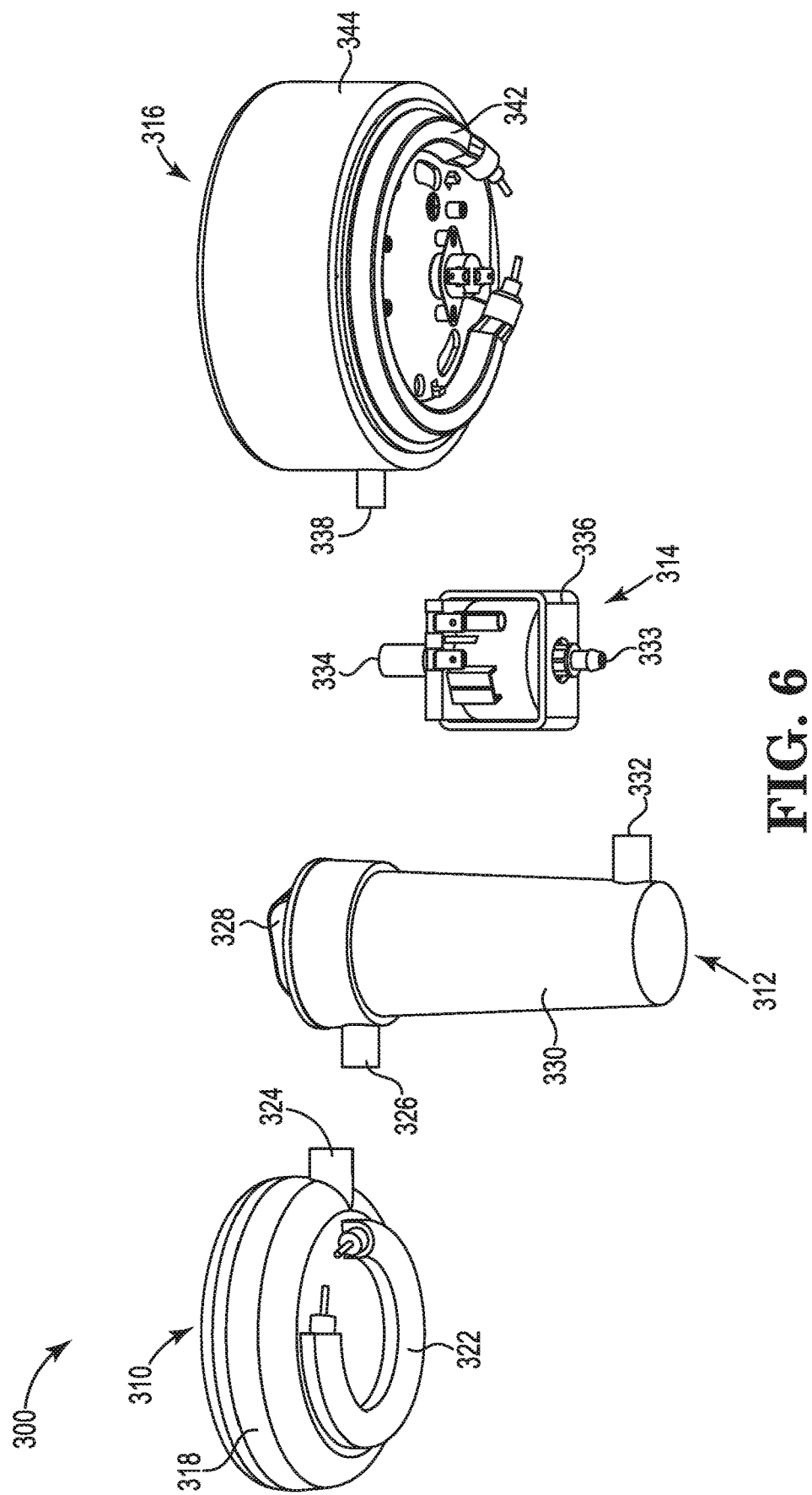
FIG. 6 is a perspective exploded view of various decalcification components of the steam generator for use with a steam station as shown with respect to FIG. 1, according to various embodiments.

A controller 360 (shown schematically with respect to FIG. 8), such as a control unit or a control system may be included in the steam generator base 12 at any suitable location, which controller 360 can be used to control the quantity and/or rate of steam production. The controller 360 is described in additional detail with respect to FIGS. 3 and 11. The controller 360 can set a temperature of a heating element, a duration of temperature exchange, a quantity of water supply and/or flow rate, among other things. In some embodiments, a user control 26 can be configured to change various parameters of the controller 360. The steam generator base 12 is also preferably connectable to a power source, such as conventional line power or electricity, by a cord or the like to provide electrical power to operate the controller 360, the steam generation unit, any pumps or the like, and preferably also to the iron 14, as discussed below. A power cord can be accommodated within a portion of the steam generator base 12 as shown at 21. Cord reels and the like can be incorporated as desired.

Connected between the steam generator base 12 and the iron 14 can be a flexible hose 22 that preferably provides a conduit within which both a steam transport line and an electrical cord can be contained. The flexible hose 22 can utilize conventional connectors, clamps, and the like to make the appropriate connections with the steam generator base 12 and the iron 14. A steam transport line (not shown) can be operatively fluidly connected, as discussed above, with the steam generation unit within the steam generator base 12 and can also be operatively fluidly connected with an interior space of the iron 14 in any conventional manner. From the interior of the iron 14, steam can be delivered through the iron's soleplate 24 by way of steam holes, as such are also conventionally known. Electrical power is preferably delivered from the steam generator base 12 (as such can be operatively connected to power) to the iron 14 by the electrical cord. Electrical power can be used to heat the soleplate 24 and to provide control power to an (iron) controller 360 having a user control 26, for example, for setting the desired temperature of the soleplate 24. A trigger 28 is also preferably provided for selectively delivering steam from the soleplate, which triggers and delivery control elements are also well-known.

A length of the flexible hose 22 provides a range of movement of the iron 14 relative to the steam generator base 12. This allows a user to move about a garment or the like from a single position of the steam generator base 12. A handle portion 30 of the iron 14 provides a gripping feature for a user to manipulate the iron 14. A hose bracket 23 can be provided from the steam generator base 12, for example, to facilitate stowing of the hose 22, especially during any movement of the steam station 10.

The present invention comprises a steam generator system including a boiler 316, where the system further comprises a sub-boiling pre-heat chamber 310 and a filter assembly 312 between the water reservoir 18 and the boiler 316 for purposes described below. According to various embodiments, a component configuration 300 for a steam generator (shown schematically in FIGS. 5-10) can include the pre-heat chamber 310, the filter assembly 312, a water (or any other fluid) pump 314, and the boiler 316. Each of the components, above, is described in greater detail, herein.

During the appliance operation, the water pump 314 will cause water to flow along the system from the water reservoir 18 to the boiler 316, where it can boil and turn to steam. Depending on the appliance operation, the steam can immediately leave the boiler 316 and travel out the iron 14, or it can accumulate in the boiler 316 or elsewhere until the user activates a steam function. Is it noted that iron 14 is merely an example of a steam delivery device, which can alternatively include a garment steamer head, or any other known or developed steam delivery device.

According to various embodiments, the pre-heat chamber 310 receives a flow of water from the water tank and raises the temperature to preferably about 60-99° C. (i.e., below the boiling point of water), more preferably to 70-90° C. At above 60° C., dissolved calcium carbonate in the water can precipitate and form solid particulates within the heated, but preferably not boiling, water. In other words, the calcium carbonate found in the water being heated is kept in the water, but converted from a dissolved form to a particulate form, suspended in the heated water.

The filter assembly 312 is operatively located after the pre-heat chamber 310 so it can trap and collect the solid particulates from the water, preventing them from reaching the boiler 316. Water can be moved along fluid connections provided between the various components, and the water pump 314 may preferably be located between filter assembly 312 and boiler 316. Water pump 314 (or other pump(s)) can be located elsewhere so long as water flow is provided from water reservoir 18 through to boiler 316, as needed. A gravity feed may also be used, for example, to supply water from reservoir 18 to pre-heat chamber 310.

Figure 7:
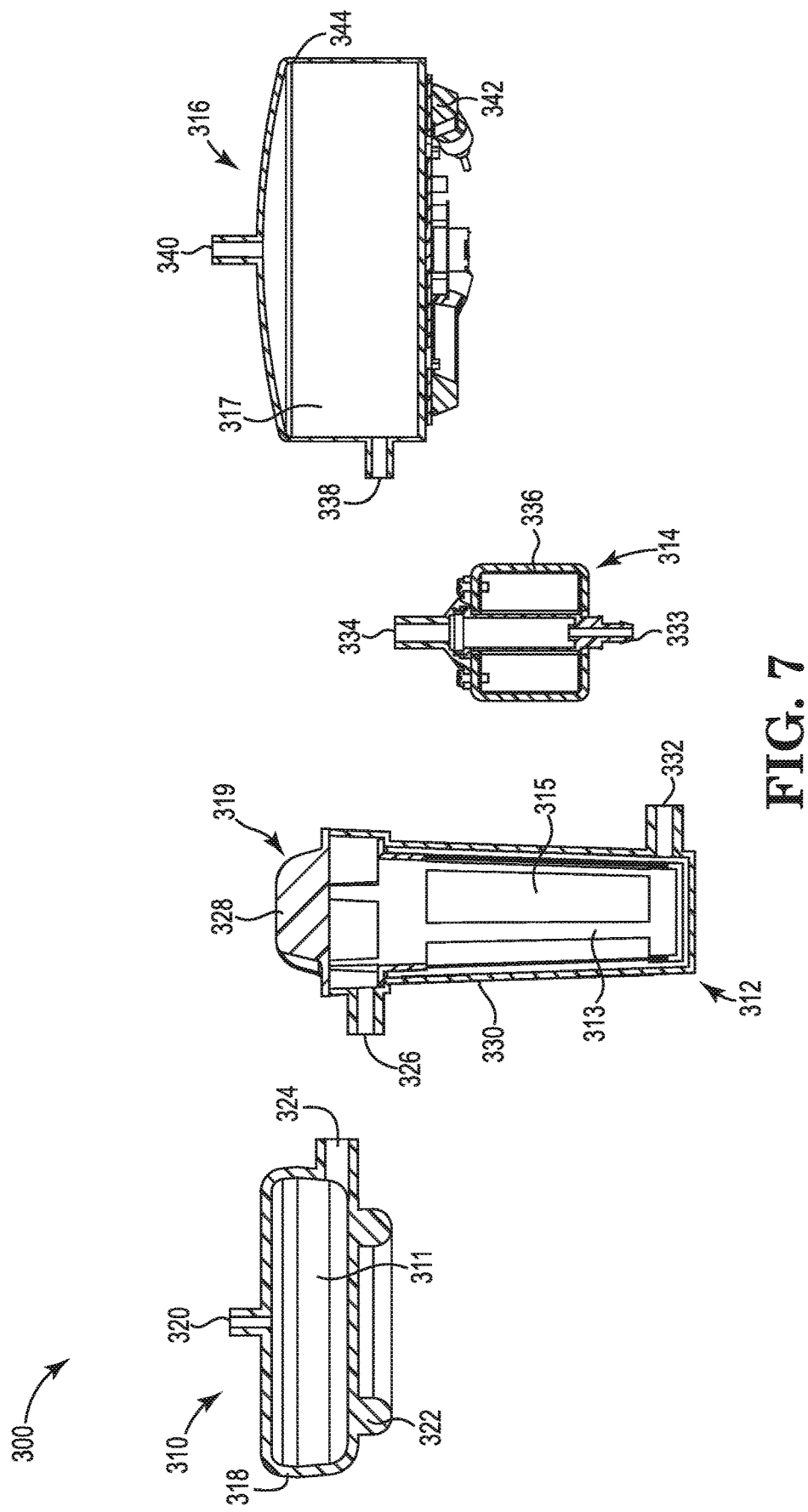
FIG. 7 is a side exploded cross-section view of various decalcification components of the steam generator for use with a steam station as shown with respect to FIG. 1, according to various embodiments.
Figure 9:
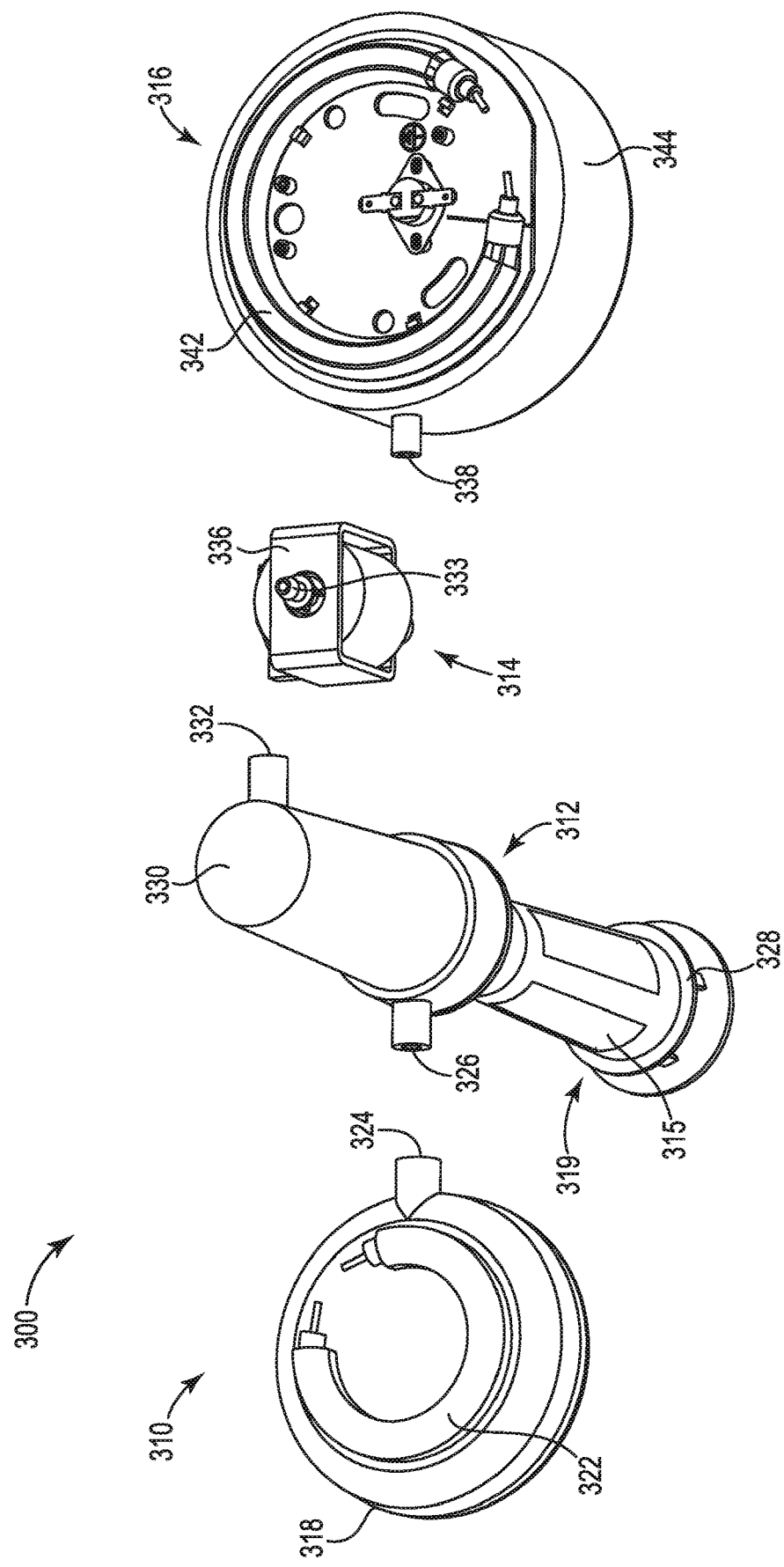
FIG. 9 is another perspective exploded view of various decalcification components of the steam generator for use with a steam station as shown with respect to FIG. 1 with a filter cartridge shown removed from a respective filter housing, according to various embodiments.
Figure 10:
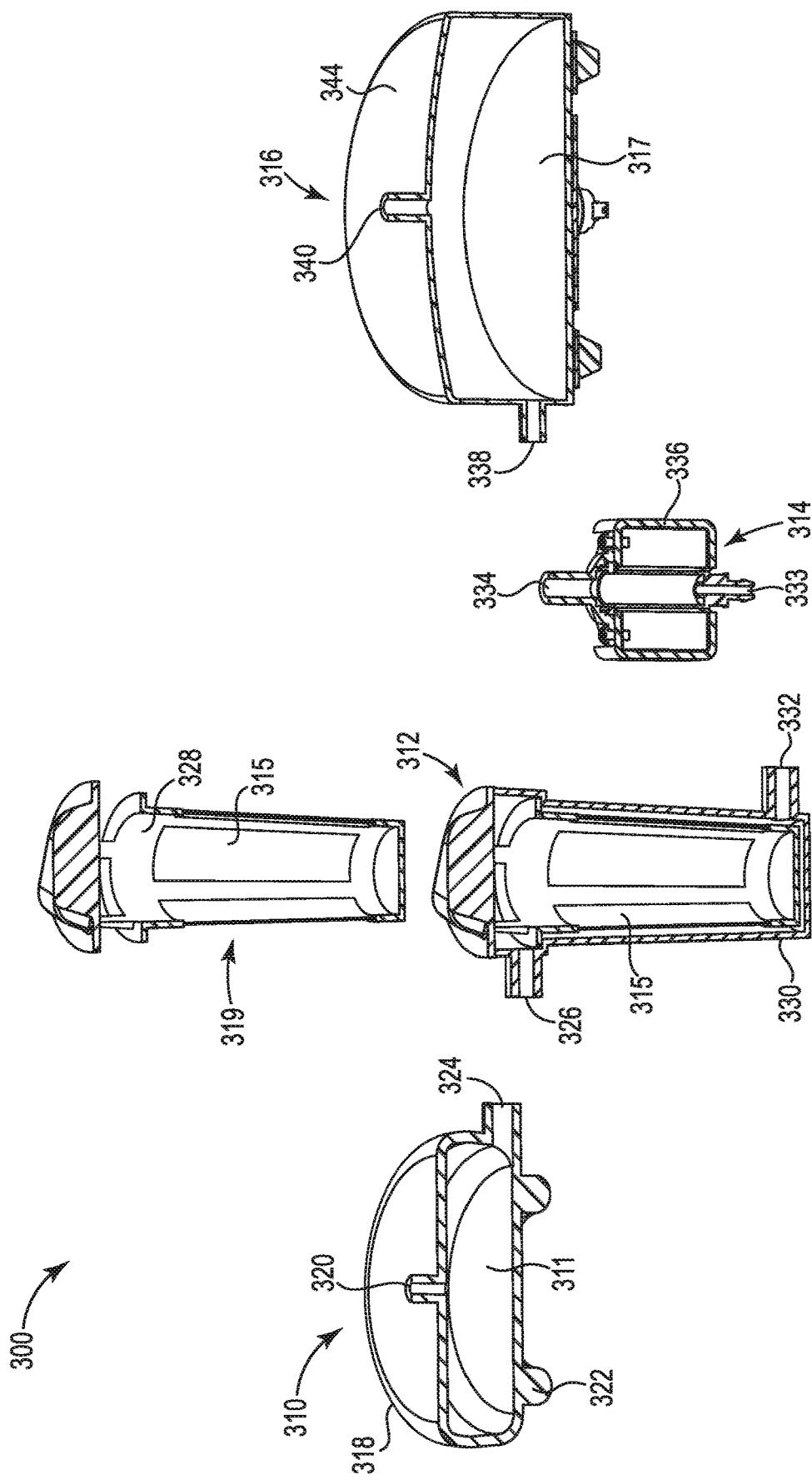
FIG. 10 is another perspective exploded view of various decalcification components of the steam generator for use with a steam station as shown with respect to FIG. 1 with a filter cartridge shown both loaded in and removed from a respective filter housing, according to various embodiments.

As shown in FIGS. 7, 9, and 10, filter assembly 312 can include a filter cartridge 319 that can include one or more filter elements 315 and filter structure 328, which can include structural rib(s) 313. The filter elements 315 and the filter structure 328 together can be removed from the filter housing 330 as the filter cartridge 319. The filter element(s) 315 (and optionally the filter structure 328) can then be preferably emptied, rinsed, cleaned, and/or washed, and replaced for continued use. In one embodiment, simply removing the filter element(s) 315 and filter structure 328 as the filter cartridge 319, turning them over, and running tap water over the unit can substantially empty and clean the filter components of the filter cartridge 319. The filter element(s) 315 can comprise a stainless steel (or similar) mesh material, and may have a mesh pore size of 100 micros, in various embodiments. The size of the mesh openings can be smaller or larger, but is preferably sized based upon the effective size of the precipitate that results from the pre-heating. A disposable filter element 315 can instead be used.

The steam generation components can be fixed within the interior space of the steam generator base 12 in any known or developed manner. In various embodiments, one or more water pumps 314 can be utilized for assisting in the fluid flow of either the water or steam as may be desirable or necessary. Also, additional filter assemblies 312, filter cartridges 319, filter housings 330, and other water treatment components can be included. Examples of filters elements 315 can include cylindrical, planar, and various other suitable shapes, sizes, and types of filter elements 315, especially filters configured to separate particulate calcium carbonate or other calcification from water being filtered. Filter elements 315, as used herein, can preferably include three-dimensionally usable filter elements 315, where a total amount of filtration can be a function of the volume of the filter element(s) 315 of the filter cartridge 319 in use.

One advantage of this system is that it can increase the useful lifespan of the various steam generator components (in particular boiler 316), as limescale will be less likely to accumulate on the interior walls of the boiler cavity 317, which presently reduce boiler 316 performance and life. Boiler 316, if otherwise strained by excessive limescale build-up, can become overworked, overheated, or otherwise malfunction or wear. By reducing limescale build-up in the boiler 316, and instead catching the limescale particulates in the filter assembly 312, the filter assembly 312 can collect the particulate limescale, in a unit designed to do so. The combination of pre-heat chamber 310 and filter assembly 312 may also prevent limescale solids or particulates from travelling to the iron 14 and clogging up the iron 14, its soleplate holes, or discoloring the garments. In various embodiments, and as described herein, various other steam delivery devices can be substituted for iron 14.

Advantageously, the components of filter cartridge 319, including the filter element 315 and filter structure 328 that together fit within the filter housing 330, is preferably cleanable and reusable. Filter structure 328 preferably supports a number of filter elements 315 using structural rib(s) 313. The filter element(s) 315 can comprise mesh panels in an arrangement around the filter structure 328 for particulate filtration from the water. The mesh size of the filter elements 315 can be based on particulate size. In preferred embodiments, water including particulates can be controlled to flow from filter inlet 326 to filter outlet 332 of filter housing 330 from an inside of filter element 315 to an outside, where the water once reaching the outside of the filter element 315 will have its particulates already filtered out of the water. As described herein, the filter assembly 312 components can take a cylindrical, inside-out water flow configuration (described above), as shown, or the filter assembly 312 may take any other suitable shape, such as a flat, planar filter configuration, among others. In this way, particulates will be captured within and potentially fill the inside volume of the filter element(s) 315 and filter structure 328 of the filter cartridge 319.

A water source 346 (schematically shown in FIG. 8) can include water reservoir 18 or any other water source 346, as applicable. Water source 346 is fluidly connected and in fluid communication with pre-heat chamber 310 via pre-heat chamber inlet 320 and fluid conduit 348. Water source 346 and/or fluid conduit 348 can also include various components, such as additional pumps, filters, junctions, heaters, etc. Once water from water source 346 reaches the pre-heat chamber 310, the water can completely or partially fill a pre-heat chamber cavity 311 defined by walls 318. As shown in FIGS. 5-10, an example of a pre-heat chamber heating element 322 is approximately shaped as a partial toroid, and is attached to a lower side of pre-heat chamber 310. In this case, heat is conducted through the wall 318 to within the pre-heat chamber 310 to heat the water.

In some embodiments, the location of the heating element 322 (whether inside or outside the pre-heat chamber wall 318) can affect the heating distribution of the water contained in the pre-heat chamber at a particular point in time. According to various embodiments, the heating element 322 can be located on a surface of the pre-heat chamber 310. Heating element 322 can include a Calrod, resistive-type electrical heating device(s), gas-based heating device(s), a thin-film heating element(s), a tube heating element(s), combinations thereof, among other types of heating elements, as known in the art or developed. Preferably, the heating elements are controllable so that water contained in the pre-heat chamber will not reach a boiling point, but may be controlled to be heated to various temperatures. Any number and/or location of temperature, fluid flow rate, or volume sensors can be incorporated for controller 360 use.

Control systems (including controller 360, see also FIGS. 8 and 11), as known, can be included to manage and maintain a desired water temperature within pre-heat chamber 310. For example, using various control systems, water temperature can be determined (and the water heated) as a function of heat applied to a present, past, or future flow rate of water. In preferable embodiments, the water can be heated in a continuous heating process at the pre-heat chamber 310 and/or the boiler 316 meaning the water can enter the pre-heat chamber 310 at a supplied temperature (likely ambient) from the water source 346 and at a flow rate, the water can be heated as it flows through or along the pre-heat chamber 310 at the flow rate, and the water can exit the pre-heat chamber 310 at a desired temperature to cause precipitation of the calcium compound from the water at the same flow rate. Alternatively, the water can be heated in stages or all at once as the water is supplied at a desired volume on a cycle by cycle basis.

Once water from water source 346 is pre-heated at the pre-heat chamber 310, the pre-heat chamber outlet 324 may fluidly communicate the water and precipitate to filter assembly 312 by fluid conduit 350. The water can enter the filter assembly 312 by filter inlet 326, and the water may then pass through filter housing 330, and filter element(s) 315, which may preferably be supported by filter structure 328. Filter element(s) 315 can be size, configured, and/or controlled to have a maximum water flow rate that exceeds typical need when the filter element 315 is relatively free of particulates and to allow for cases where filter element 315 is partially clogged with calcium carbonate (or other) particulates caught in pores of the filter element 315 (e.g., pore size of 100 microns or other suitable pore size). In some embodiments, the filter element 315 of the filter cartridge 319 has a filter volume that fills with particulates as the particulates are filtered from the water flowing through filter assembly 312.

Preferably, filter structure 328 and filter element 315 are removable as a unit from filter housing 330, whereby the filter components can be emptied, cleaned, rinsed, and/or washed by a user or consumer. After removing and cleaning the filter components, the filter element 315 and filter structure 328 can be replaced back into the filter housing 330 of filter assembly 312. In alternative embodiments, various replacement components (e.g., filter element 315 and filter structure 328 individually, or together as filter cartridge 319) can be purchased in place of cleaning, especially, e.g., if the particular parts have been in heavy use for substantial amounts of time.

Figure 8:
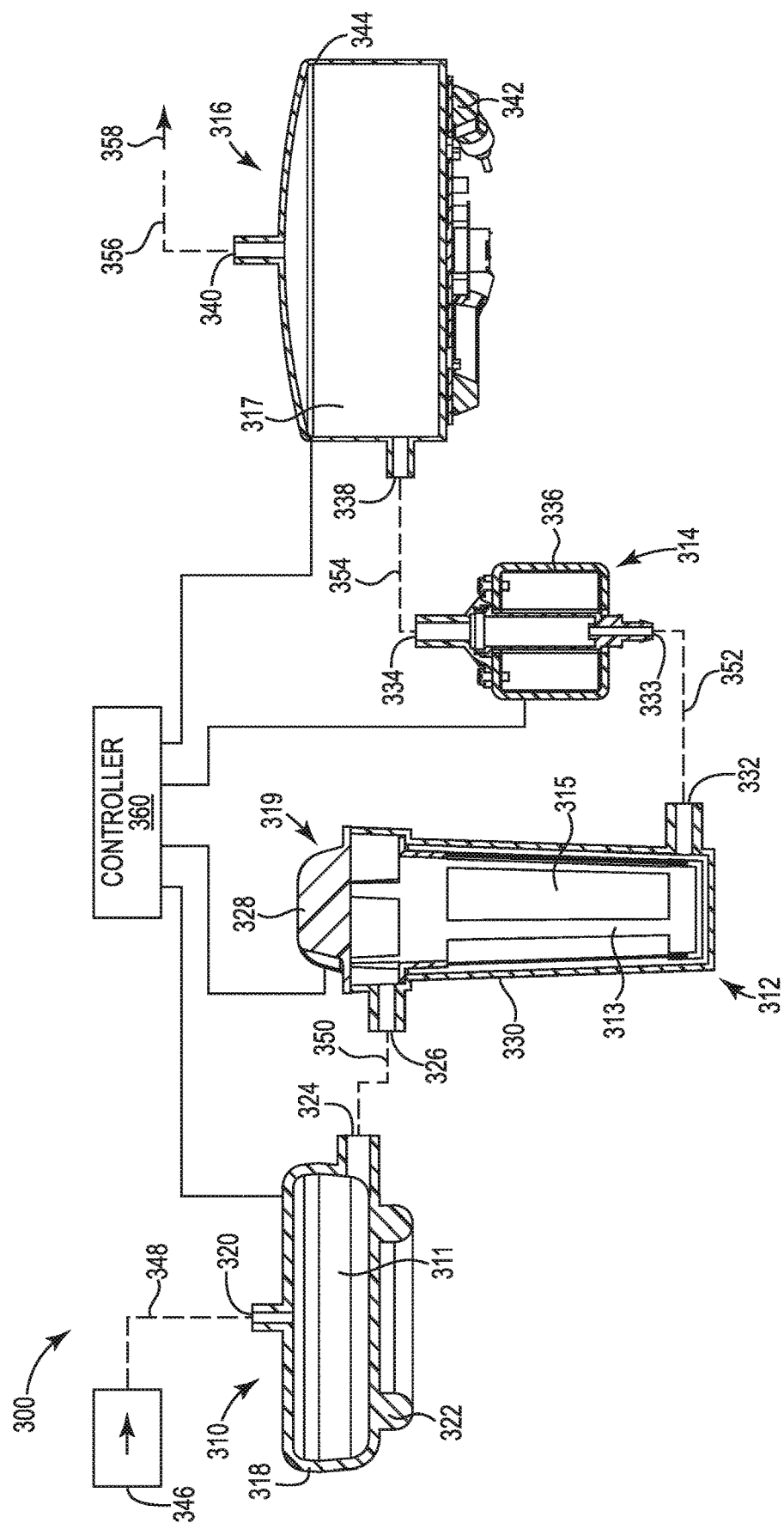
FIG. 8 is a side exploded cross-section view of various decalcification components of the steam generator for use with a steam station as shown with respect to FIG. 1 with an example operative fluid flow and schematic control diagram, according to various embodiments.

As shown in FIG. 8, once the water has been filtered by filter assembly 312 and the particulates removed from the water, the filtered water can exit filter outlet 332 and enter the water pump 314 at pump inlet 333. The filter outlet 332 can be configured to be in fluid communication with the pump inlet 333 by an operative connection such as fluid conduit 352. Fluid conduits, as used herein, can include any suitable hose, conduit, conveyance means, connection, etc. capable of carrying and/or transferring a liquid and/or fluid, and that can be fixed in place by conventional means including clamps and the like. Fluid conduits can include various fluid, operative, and other connections.

Water pump 314 can include a pump housing 336 and a pump motor (not shown), which can be an electric motor, preferably. Water pump 314 can be controlled by a user or a controller (e.g., controller 360) according to various embodiments. For example, water pump 314 can be activated to pump water into boiler 316 when boiler 316 is empty, low, or when a user has begun using the steam generator and/or steam station, among other circumstances.

The water pump 314 is shown in fluid communication with the boiler 316 via fluid conduit 354. Fluid conduit 354 is connected to the water pump outlet 334 and the boiler inlet 338. Boiler 316 includes a boiler housing 344, a boiler cavity 317, and a boiler heating element 342. The boiler heating element 342 can be similar to the pre-heat chamber heating element 322, or can be configured and/or controlled differently. In some embodiments, the boiler heating element 342 is located outside the boiler chamber 317, but in contact with boiler housing 344. Heating element 342 can include a Calrod, resistive-type electrical heating device(s), gas-based heating device(s), a thin-film heating element(s), a tube heating element(s), combinations thereof, among other types of heating elements, as known in the art or developed. Preferably, the heating elements are controllable so that water contained in the boiler 316 will reach the boiling point of water to generate steam. As described above, any number and/or position of temperature, fluid flow rate, or volume sensors can be located within the system.

The boiler 316 can be controlled to maintain an amount of steam when activated, awaiting only a user's input, such as an activation of steam through steam generator controls or switches, and having a nearly instant supply of steam when desired. In alternative embodiments, the boiler 316 can remain idle when the user is not steaming garments, or may merely pre-heat the water while awaiting further instructions prior to heating water contained in the boiler chamber 317 to the boiling point of water (e.g., 100° C.). In some embodiments, the boiler 316 can received about 10-40 g of water from water pump 314 at a time, as a cycle. Likewise, the pre-heat chamber 310 can receive a similar amount (10-40 g) of water per user steam cycle or operation. In other embodiments, the pre-heat chamber 310 and/or the boiler 316 can receive a constant or steady supply of incoming water and can continuously heat the water to create steam.

Steam can be caused to exit the boiler 316 via boiler outlet 340, which itself can be in fluid communication with a steam exit 358 via fluid conduit 356. Steam exit 358 can be connected, for example, to a steam delivery device such as iron 14, whereby the steam can be applied to a garment. The steam will preferably have little to no calcium carbonate that reaches the garment, as described. If iron 14 is used, the iron may have a control function whereby a user can choose a free flow or steam or a set steam cycle. In other embodiment, the steam flow may be determined automatically, for example, based on preset parameters or circumstances.

In some embodiments, the various steam generator components (e.g., pre-heat chamber 310, filter assembly 312, water pump 314, or boiler 316) can contain varying amount of air or non-steam gas. For example, following pre-heating of water at the pre-heat chamber 310, the heated water can proceed to filter assembly 312, but the filter assembly 312 may not be completely full with the pre-heated water. Therefore, filter assembly 312 can operate even when not fully filled with the pre-heated water. Some degree of air in the system, including at the filter assembly 312, can be accommodated and may not substantially reduce the performance of the various components described, herein. In other embodiment, the system can be controlled to be completely filled with $H_2O$, including water, water vapor, and/or steam in various locations. Some air can be present in the steam generation system without substantially affective performance, although a full system may be optimal for pumping or steam generation performance.

Figure 11:
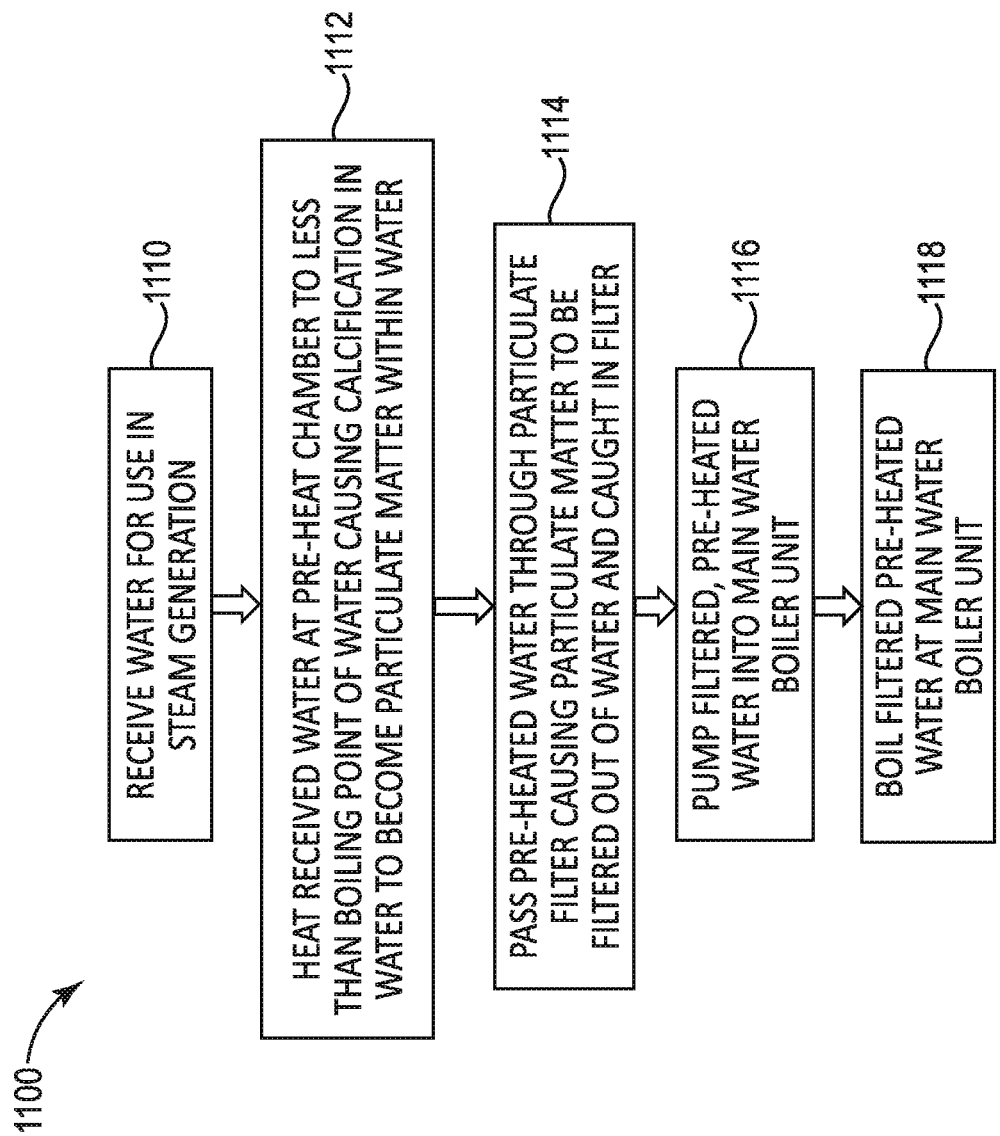
FIG. 11 is a flowchart of a steam generation process, according to various embodiments.

FIG. 11 is a flowchart of a steam generation process 900, according to various embodiments.

The process 1100 can be in accordance with the description and structures of FIGS. 1-10, described herein. In various embodiments, one or more controllers (e.g., controller 360) can be configured to control various components in order to perform process 1100, or otherwise cause process 1100 to be performed. As schematically shown in FIG. 8. FIG. 8 shows a single controller 360 operatively connected to at least the pre-heat chamber 310, the water pump 314, the boiler 316, and optionally to the filter assembly 312 and/or various temperature, fluid flow rate, or volume sensors (not shown). The controller 360 can also be operatively connected to any or all sensors, if present, or any other components. Many other variations on process are contemplated herein and the specific embodiments described are not intended to be limited to the particular described embodiments. The controller 360 can include or be operatively connected to one or more processors, memory modules, storage devices, input/output controllers 360 and devices, interconnect bus apparatuses, electrical or other data-based connections. Furthermore, the controller 360 can be operatively connected and in operative communication with various steam generator and/or steam station components, such as a pre-heat chamber 310, a filter assembly 312, a water pump 314, a boiler 316, and/or various sensors, as described herein.

Process 1100 can begin by receiving water for use in steam generation at operation 1110. The received water can be received at reservoir 18. Following operation 1110, the received water can be heated at the pre-heat chamber 310 to a temperature that is less than the boiling point of water, but greater than the ambient temperature of water, (i.e. to a temperature at which at least $CaCO_3$ or any other calcium compound that might be present precipitates as particulates) causing calcification in the water to become particulate matter within the water at operation 1112.

At operation 1114, the pre-heated water can pass through a particulate filter assembly 312, causing particulate matter to be filtered out of the water and caught in the filter assembly 312. Following operation 1114, the filtered, preheated water can be pumped using water pump 314 or otherwise flow into the main water boiler (unit) 316 at operation 1116. Finally, the preheated, filtered water can be boiled at the main water boiler 316 to create usable steam.

In another embodiment of a method of controlling a steam generator, a first quantity of water can be heated to a temperature less than the boiling point of water, using a pre-heat chamber 310 in operative communication with a controller 360. The water can be heated such that if the water contains a calcium compound, such as calcium carbonate, the calcium compound is caused to take a particulate form, pumping the water through a filter assembly 312, using a water pump 314 in operative communication with the controller 360. The filter assembly 312 can include at least a removable particulate filter element 315, where the filter element 315 is preferably reusable and cleanable. The water pump 314 can be controlled to pump the water to a boiler 316 in operative communication with the controller 360, and boiling the water using the boiler 316 such that steam is produced.

In various embodiments, the method can further include catching and filtering particulate matter out of the water using the removable particulate filter cartridge 319 when the water pump 314 operatively causes water to flow through the steam generator.

In various embodiments, the controller 360, as in FIG. 8, is configured to control the pre-heat chamber, the water pump 314, and the boiler 316 such that the first quantity of water is selectively pumped using the water pump 314, selectively heated at the pre-heat chamber 310, and selectively boiled at the boiler 316 such that a desired quantity of steam is produced. In particular embodiments, an indication of the desired quantity of steam to be produced is received from a user input received at the controller 360.

The controller 360 can be further configured to control the pre-heat chamber 310, the water pump 314, and the boiler 316 based on at least a reading receiving from the filter assembly 312. For example, based on a first quantity of water received and present within the pre-heat chamber 310, various other aspects can be affected through control via the controller 360. For instance, if the first quantity of water is a relatively small quantity (e.g., a few milliliters, etc.) then the controller 360 can send a signal to the pre-heat chamber that a relatively small heat wattage (in the case of an electrically-heated pre-heat chamber 310) should be sent to the pre-heat chamber 310 such that the pre-heat chamber 310 avoids boiling the water prior to the water reaching the boiler 316 at a later stage. In preferable embodiments, the first quantity of water is heated first at the pre-heat chamber 310 and further heated/boiled at the boiler 316 after passing through the filter assembly 312. The water pump(s) 314 can be located in any location along a steam generator fluid path.

An example controller 360 can also receive signals and readings from various sensors of the various steam generator components, which can receive readings or signals related to fluid flow rate, temperature, etc. Based on these readings or signals, various aspects of steam generation can be controlled, configured, adjusted, and/or set to properly produce a desired and ideal amount, temperature, and other aspects of steam to be generated. Any or all steam generation components can send and/or receive signals to and from the controller 360. Based on these signals and/or any signals produced by the controller 360, the various control aspects throughout the method and/or process can be adjusted accordingly. Control aspect can utilize various control schemes to optimize performance, such as proportional-integral-derivative (PID) control, among others.

The invention claimed is:

1. A steam generator, comprising:
a pre-heat chamber configured to heat incoming water to a temperature less than the boiling point of water, wherein the pre-heat chamber is operatively connected with a pre-heat temperature controller to heat the water to a desired pre-heat temperature below the boiling point of water so that if the water contains a calcium compound, the calcium compound will be caused to take a particulate form;
a filter assembly in fluid communication with the pre-heat chamber that is operatively positioned downstream of the pre-heat chamber for receiving water from the pre-heat chamber, the filter assembly including at least a particulate filter element that is configured to remove calcium compounds in particulate form from the water;
a water pump in fluid communication with the filter assembly, and operative to cause water flow through the steam generator; and
a boiler in fluid communication with the water pump, wherein the water pump is configured to cause water to flow from the filter assembly to the boiler, and wherein the boiler operatively positioned downstream of the pre-heat chamber and operatively connected to a boiler temperature controller to boil water such that steam is produced.

2. The steam generator of claim 1, wherein the boiler is configured to maintain at least some steam when the steam generator is not in active use.

3. The steam generator of claim 1, further comprising a steam delivery device, wherein the steam delivery device includes holes for applying steam generated by the boiler to a garment.

4. The steam generator of claim 1, wherein the pre-heat chamber includes a heating element located on a surface of the pre-heat chamber.

5. The steam generator of claim 1, wherein the pre-heat chamber includes a heating element located within a cavity of the pre-heat chamber.

6. The steam generator of claim 1, wherein the filter element has a stainless steel mesh with a pore size of 100 microns or less.

7. The steam generator of claim 1, further comprising a water reservoir fluidly connected to the pre-heat chamber of the steam generator.

8. The steam generator of claim 1, wherein the pre-heat chamber and the boiler are controllable by the pre-heat and boiler temperature controllers to be operable at the same time.

9. A steam station, comprising:
a steam delivery device fluidly connected to a steam generator;
a water reservoir fluidly connected to the steam generator;
a steam generation base comprising the steam generator, wherein the steam generator comprises:
a pre-heat chamber configured to heat incoming water to a temperature less than the boiling point of water, wherein the pre-heat chamber is operatively connected with a pre-heat temperature controller to heat the water to a desired preheat temperature below the boiling point of water so that if the water contains a calcium compound, the calcium compound will be caused to take a particulate form;

a filter assembly in fluid communication with the pre-heat chamber that is operatively positioned downstream of the pre-heat chamber for receiving water from the preheat chamber, the filter assembly including a particulate filter element that is configured to remove calcium compounds in particulate form from the water;

a water pump in fluid communication with the filter assembly, and operative to cause water flow through the steam generator; and a boiler operatively positioned downstream of the pre-heat chamber and in fluid communication with the water pump, wherein the water pump is configured to cause water to flow from the filter assembly to the boiler, and wherein the boiler is operatively connected to a boiler temperature control circuit to boil water such that steam is produced.

10. The steam station of claim 9, wherein the boiler is configured to maintain at least some steam when the steam generator is not in active use.

11. The steam station of claim 9, wherein the pre-heat chamber and the boiler are controllable by the pre-heat and boiler temperature controllers to be operable at the same time.

12. The steam station of claim 9, wherein the pre-heat chamber includes a heating element located on a surface of the pre-heat chamber.

13. The steam station of claim 9, wherein the pre-heat chamber includes a heating element located within a cavity of the pre-heat chamber.

14. A method of controlling a steam generator, comprising:

heating water to a temperature less than the boiling point of water, within a pre-heat chamber in operative communication with a first temperature control circuit, the temperature control circuit setting a pre-heat temperature for causing a calcium compound dissolved within the water to take a particulate form;

transferring water including particulate calcium compound from the pre-heat chamber through a filter assembly that is operatively positioned downstream of the pre-heat chamber and filtering particulate calcium compound from the water;

transferring filtered water to a boiler provided downstream of the pre-heat chamber in operative communication with a second temperature control circuit; and boiling the water using the boiler and thereby generating steam.

15. The method of claim 14, further comprising:

filtering particulate matter out of the water using a removable particulate filter and using a water pump for pumping the water to flow through the steam generator.

16. The method of claim 14, wherein a controller is configured to control the first temperature control circuit in communication with the pre-heat chamber, the water pump, and the second control circuit in communication with the boiler such that the water is selectively pumped using the water pump, selectively heated at the pre-heat chamber, and selectively boiled at the boiler such that steam is produced.

17. The method of claim 16, wherein an indication of a desired output of steam to be produced is received from a user input received at the controller.

18. The method of claim 16, wherein the controller is further configured to control the pre-heat chamber, the water pump, and the boiler based on at least a receiving a signal from the filter assembly.

19. The method of claim 14, wherein the controller is further configured for heating the pre-heat chamber and the boiler at the same time as an inline continuous steam generating process.

* * * * *